United States Patent
Dai et al.

(10) Patent No.: US 8,929,476 B2
(45) Date of Patent: Jan. 6, 2015

(54) METHOD AND USER EQUIPMENT FOR FEEDING BACK CHANNEL STATE INFORMATION

(75) Inventors: Bo Dai, Shenzhen (CN); Yijian Chen, Shenzhen (CN); Jun Xu, Shenzhen (CN); Yunfeng Sun, Shenzhen (CN); Junfeng Zhang, Shenzhen (CN)

(73) Assignee: ZTE Corporation, Shenzhen City, Guangdong Province (CN)

( * ) Notice: Subject to any disclaimer, the term of this patent is extended or adjusted under 35 U.S.C. 154(b) by 0 days.

(21) Appl. No.: 13/979,406

(22) PCT Filed: Dec. 2, 2011

(86) PCT No.: PCT/CN2011/083381
§ 371 (c)(1),
(2), (4) Date: Aug. 6, 2013

(87) PCT Pub. No.: WO2012/094930
PCT Pub. Date: Jul. 19, 2012

(65) Prior Publication Data
US 2013/0315337 A1 Nov. 28, 2013

(30) Foreign Application Priority Data

Jan. 12, 2011 (CN) .......................... 2011 1 0005922

(51) Int. Cl.
*H04B 7/02* (2006.01)
*H04B 7/04* (2006.01)
*H04L 1/00* (2006.01)
*H04L 5/00* (2006.01)
*H04L 1/06* (2006.01)

(52) U.S. Cl.
CPC ............ *H04B 7/0456* (2013.01); *H04L 1/0031* (2013.01); *H04L 5/0057* (2013.01); *H04L 1/06* (2013.01); *H04L 5/0023* (2013.01); *H04L 5/0048* (2013.01)
USPC ........... 375/267; 375/295; 375/299; 375/316; 375/347; 455/101; 455/500; 455/132; 370/329

(58) Field of Classification Search
CPC ...... H04B 7/024; H04B 7/0417; H04B 7/063; H04B 7/0632; H04B 7/0456; H04B 7/0478; H04B 7/0413; H04B 7/0486; H04B 7/0452; H04B 7/0619; H04B 7/0658; H04B 7/0663; H04B 7/061; H04B 7/0636
USPC .......... 375/295, 267, 299, 316, 347; 455/450, 455/101, 500, 132; 370/329
See application file for complete search history.

(56) References Cited

U.S. PATENT DOCUMENTS

2012/0188976 A1* 7/2012 Kim et al. ..................... 370/329

FOREIGN PATENT DOCUMENTS

| CN | 101867458 A | 10/2010 |
|---|---|---|
| CN | 101917260 A | 12/2010 |

(Continued)

OTHER PUBLICATIONS

LTE-Advanced Main Standard Trends and Key Technologies (LG Electronics), Nov. 4, 2010, the whole document.
(Continued)

*Primary Examiner* — Rahel Guarino
(74) *Attorney, Agent, or Firm* — Ling Wu; Stephen Yang; Ling and Yang Intellectual Property

(57) ABSTRACT

The present document provides a method for feeding back channel state information and a user equipment. The method includes: a user equipment determining a second parameter y of a feedback mode according to the number of Channel-State Information-reference signals (CSI-RS) ports configured by a high layer signaling or according to the number of CSI-RS ports and indication information indicating whether to feed back a pre-coding matrix indicator (PMI) and rank indicator (RI); the user equipment determining the feedback mode according to a transmission mode configured by the high layer signaling, a first parameter x of the feedback mode and the second parameter y of the feedback mode; and the user equipment feeding back the channel state information according to the determined feedback mode. The present document improves the system flexibility and performance and reduces the feedback overhead.

20 Claims, 1 Drawing Sheet

(56) References Cited

FOREIGN PATENT DOCUMENTS

CN 102045762 A 5/2011
CN 102111246 A 6/2011

OTHER PUBLICATIONS

International Search Report for PCT/CN2011/083381 dated Feb. 16, 2012.

"On non-PMI based feedback in Rel-10"; CMCC, CATT, 6.3.2.3, Discussion and Decision; 3GPP TSG-RAN WG1#63 Jacksonville, USA, Nov. 15-19, 2010; R1-106313.

"Evolved Universal Terrestrial Radio Access (E-UTRA)"; 3rd Generation Partnership Project; Technical Specification Group Radio Access Network; Physical layer procedures; Release 10; 3GPP TS 36.213 V10.0.1; Dec. 2010; see pp. 41-61.

* cited by examiner

METHOD AND USER EQUIPMENT FOR FEEDING BACK CHANNEL STATE INFORMATION

TECHNICAL FIELD

The present document relates to the mobile wireless communication field, and in particular, to a user equipment and a method for feeding back channel state information for a specific transmission mode in a wireless communication system.

BACKGROUND OF THE RELATED ART

In the wireless communication technology, when a base station side (e.g., evolved node B, i.e., eNB) transmits data using a plurality of antennas, it can adopt a way of spatial multiplexing to improve a data transmission rate, that is, a transmitting end transmits different data at different antenna positions but using the same time frequency resources, and a receiving end (such as a user equipment, UE) also uses the plurality of antennas to receive the data. With a single user, resources of all the antennas are allocated to the same user, that user occupies independently physical resources allocated by the base station side within one transmission interval, and this kind of transmission mode is called as Single User Multiple-Input Multiple-Out-put (abbreviated as SU-MIMO); with multiple users, the space resources of various antennas are allocated to different users, one user shares the physical resources allocated by the base station side with at least one other user within one transmission interval, and the share way can be a space division multiple access way or a space division multiplexing way, and this kind of transmission mode is called as Multiple User Multiple-Input Multiple-Out-put (abbreviated as MU-MIMO); wherein, the physical resources allocated by the base station side refer to the time frequency resources. If a transmission system supports the SU-MIMO and the MU-MIMO at the same time, then the eNB needs to provide data under these two kinds of modes for the UE. When the UE is in the SU-MIMO mode or the MU-MIMO mode, it needs to know a Rank used by the eNB to transmit the MIMO data to that UE. In the SU-MIMO mode, the resources of all the antennas are allocated to the same user, the number of layers used for transmitting the MIMO data is just equal to the rank used by the eNB transmitting the MIMO data; correspondingly, in the MU-MIMO mode, the number of layers used by one user for transmission is less than the total number of layers for the eNB transmitting the MIMO data; and if switching between the SU-MIMO mode and the MU-MIMO is required to be performed, the eNB needs to notify the UE of different control data under different transmission modes.

In a Long Term Evolution (LTE) system, control signalings required to be transmitted in an uplink includes: Acknowledgement/Negative Acknowledgement (ACK/NACK) message, and three formats of information reflecting Channel State Information (CSI) of an downlink physical shared channel: channels quality indication (CQI), pre-coding matrix indicator (PMI) and rank indicator (RI).

In the LTE system, the ACK/NACK message is transmitted on a Physical Uplink Control Channel (PUCCH) by a format of 1/1a/1b (PUCCH format1/1a/1b); if the terminal (User Equipment, UE) needs to send the uplink data, then the data is transmitted on a Physical Uplink Shared Channel (PUSCH); the feedback of the CQI/PMI, the RI can be a periodic feedback, or can be a non-periodic feedback, and the specific feedback is shown in Table 1:

TABLE 1

Uplink physical channel corresponding to the periodic feedback and the non-periodic feedback

| Scheduling mode | Periodic CQI report channel | Non-periodic CQI report channel |
| --- | --- | --- |
| Frequency non-selectivity | PUCCH | |
| Frequency selectivity | PUCCH | PUSCH |

Wherein, as to the CQI/PMI, RI of the periodic feedback, if the UE does not need to send the uplink data, then the CQI/PMI, RI of the periodic feedback are transmitted on the PUCCH by a format of 2/2a/2b (PUCCH format2/2a/2b), and if the UE needs to send the uplink data, then the CQI/PMI, RI are transmitted on the PUSCH; as to the CQI/PMI, RI of the non-periodic feedback, they are only transmitted on the PUSCH.

The long term evolution Release 8 standard defines the following three kinds of downlink physical control channels: Physical Control Format Indicator Channel (abbreviated as PCFICH), Physical Hybrid Automatic Retransmission Request Indicator Channel (abbreviated as PHICH) and Physical Downlink Control Channel (abbreviated as PDCCH). The PDCCH is used for carrying Downlink Control Information (abbreviated as DCI), including: uplink and downlink scheduling information, and uplink power control information. The DCI format is divided into the following types: DCI format 0, DCI format 1, DCI format 1A, DCI format 1B, DCI format 1C, DCI format 1D, DCI format 2, DCI format 2A, DCI format 3 and DCI format 3A, etc.; wherein, the transmission mode 5 supporting the MU-MIMO utilizes the downlink control information of the DCI format 1D, and a Downlink power offset field $\delta_{power-offset}$ in the DCI format 1D is used for indicating the information of reducing power of one user by half in the MU-MIMO mode (that is, $-10 \log 10(2)$). Because the transmission mode 5 of the MU-MIMO only supports the MU-MIMO transmission of two users, through this downlink power offset field, the transmission mode 5 of the MU-MIMO can support the dynamic switching between the SU-MIMO mode and the MU-MIMO mode; but the DCI format only supports transmission of one stream for one UE regardless of in the SU-MIMO mode or the MU-MIMO mode. The LTE Release 8 supports the single user transmission of two streams at most in a transmission mode 4, but, because the switching between the transmission modes can only be semi-static, it cannot perform the dynamic switching between the single user multi-stream transmission and the multi-user transmission in the LTE Release 8.

In an LTE Release 9, in order to enhance the downlink multi-antenna transmission, a transmission mode of the dual streams beamforming is introduced, which is defined as a transmission mode 98, and the downlink control information adds a DCI format 2B to support that transmission mode. There is an identification bit of a scrambling identity (abbreviated as SCID) in the DCI format 2B to support two different scrambling sequences. The eNB can allocate the two scrambling sequences to different users, to multiplex a plurality of users in the same resource. In addition, when only one transmission block is enabled, a new data indication (NDI) bit corresponding to a disabled transmission block is also used to indicate an antenna port when transmitting by single-layer.

In addition, in an LTE Release 10 (Release 10), in order to further enhance the downlink multi-antenna transmission, a transmission mode of a new closed-loop space multiplexing is added, which is defined as a transmission mode 9. This kind of transmission mode not only can support the single user MIMO, but also can support the multi-user MIMO, and moreover can support the dynamic switching between both of them. In addition, this kind of transmission mode supports transmission of 8 antenna ports also. Such new transmission mode has already determined to use a Demodulation Reference Signal (abbreviated as DMRS) as a pilot frequency for demodulating, and the UE needs to obtain a position of the pilot frequency, then it can make estimation of channels and interference on the pilot frequency. Different total numbers of the transmission layers have different pilot frequency patterns, for example, there are three kinds of different DMRS patterns in the LTE Release 10 preliminarily; specifically, when the total number of the transmission layers or the rank is 1 or 2, the first pattern (DMRS pattern 1) is used; when the total number of the transmission layers or the rank is 3 or 4, the second pattern (DMRS pattern 2) is used, when the total number of the transmission layers or the rank is any value of 5 to 8, the third pattern (DMRS pattern 3) is used. In the SU-MIMO mode, the data in all transmission layers are sent to the same UE, so as long as the UE obtains the rank, it can acquire the pattern of the pilot frequency and also can acquire the position of the pilot frequency. In the SU-MIMO mode, the UE needs to acquire the rank and the number of the layers for performing transmission to the UE at the beginning, and also the UE needs to acquire the pilot frequency pattern for transmission, then it can obtain the position of the pilot frequency of the interference. In addition, different DMRS ports use different spectrum spreading codes, and the UE also needs to acquire the spectrum spreading code used for transmission, thus it can obtain messages on the pilot frequency.

In the R10, the UE, through high level signaling, is semi-statically configured to receive data transmission of the Physical Downlink Shared Channel (PDSCH) according to an indication of PDCCH in a UE-Specific search space and based on one of the following transmission modes:

mode 1: Single-antenna port; port 0;
mode 2: Transmit diversity;
mode 3: Open-loop spatial multiplexing;
mode 4: Closed-loop spatial multiplexing;
mode 5: Multi-user MIMO;
mode 6: Closed-loop Rank=1 pre-coding;
mode 7: Single-antenna port; port 5;
mode 8: Dual layer transmission, that is, dual streams beamforming;
mode 9: space multiplexing of at most 8 layers.

In the R10, as to the feedback of the physical uplink control channel PUCCH, the transmission mode 9 supports the feedback mode of mode 1-1 and mode 2-1. As to the feedback mode of mode 1-1 of the transmission mode 9, it further includes a sub-mode 1 and a sub-mode 2 which are distinguished through the high layer configuration signaling PUCCH_format1-1_CSI_reporting_mode. As to the feedback of the physical uplink shared channel PUSCH, the transmission mode 9 needs to support three kinds of feedback modes, which are mode 1-2, mode 2-2 and mode 3-1 respectively.

In the R10, it newly adds the transmission mode 9 and the Channel-State Information-Reference Symbol (CSI-RS). The transmission mode 9 performs the channel measurement based on the CSI-RS, thus calculates and obtains the CQI. The other transmission modes perform the channel measurement based on the CRS, thus calculate the CQI. In the R10, it correspondingly adds some CSI-RS parameters to indicate its attributes also. Compared with the CRS in R8, some parameters are similar, and some parameters are newly added. For example, for the number of CSI-RS ports, it is similar with the number of CRS ports in R8, but a sub-frame configuration periodic parameter of the CSI-RS is newly added. The following parameters are cell-specific and configured by the high layer signaling, and are used for the definition of the CSI-RS, and the parameters include: the number of CSI-RS ports, CSI-RS configuration, CSI-RS sub-frame configuration parameter ICSI-RS, sub-frame configuration periodic TCSI-RS, the sub-frame offset and UE assumption on reference PDSCH transmitted power for CSI feedback $P_c$ In the R10, as to the transmission mode 9, a new concept of "dual-codebook" or "double PMI" is introduced, so two PMIs need to be fed back; as to 8 antennas, the first PMI indicates the channel state information of broadband, and the second PMI indicates the channel state information of sub-band; the whole pre-coding matrix information can be get only by obtaining two PMIs, wherein, the sub-band includes the situation of the broadband; as to 2 antennas and 4 antennas, what the first PMI indicates is a unit matrix, and the second PMI is equivalent to the PMI in the original R8 protocol.

As to the new transmission mode 9 of the R10 protocol, there is still not an effective method for distinguishing whether there is a PMI/RI feedback or no PMI/RI feedback, and this defect will cause that the transmission mode 9 is unable to support quick switching between the two feedback mode types, thereby resulting in the transmission mode 9 is unable to support the single layer transmission in a frequency division duplex (FDD) mode, and is unable to use the reciprocity of channels in a time division duplex (TDD) mode, which will reduce the system flexibility and performance.

CONTENT OF THE INVENTION

The objective of the present document is to provide a method for feeding back channel state information and a user equipment, in order to support quick switching between feedback mode types.

In order to solve the above-mentioned technical problem, the present document provides a method for feeding back channel state information, and the method comprises:

a user equipment determining a second parameter y of a feedback mode according to the number of Channel-State Information-reference signals (CSI-RS) ports configured by a high layer signaling or according to the number of CSI-RS ports and indication information indicating whether to feed back pre-coding matrix indicator (PMI) and rank indicator (RI);

the user equipment determining the feedback mode according to a transmission mode configured by the high layer signaling, a first parameter x of the feedback mode and the second parameter y of the feedback mode; and the user equipment feeding back the channel state information according to the determined feedback mode.

In the step of the user equipment determining the second parameter y of the feedback mode according to the number of CSI-RS ports, if the number of CSI-RS ports is 1, then the second parameter y of the feedback mode is 0; and if the number of CSI-RS ports is larger than 1, then the second parameter y of the feedback mode is larger than 0;

the transmission mode configured by the high layer signaling is a transmission mode 9; and in the step of the user equipment feeding back the channel state information according to the determined feedback mode, if the second parameter y of the feedback mode is 0, the user equipment does not feed back PMI and RI; and if the second parameter y of the feedback mode is larger than 0, the user equipment feeds back PMI and RI.

In the step of the user equipment determining the second parameter y of the feedback mode according to the number of CSI-RS ports and the indication information, if the number of CSI-RS ports is 1, then the second parameter y of the feedback mode is 0;

if the number of CSI-RS ports is larger than 1 and the indication information indicates that PMI and RI are not fed back, then the second parameter y of the feedback mode is 0;

if the number of CSI-RS ports is larger than 1 and the indication information indicates that PMI and RI are fed back, then the second parameter y of the feedback mode is larger than 0;

the transmission mode configured by the high layer signaling is a transmission mode 9; and in the step of the user equipment feeding back the channel state information according to the determined feedback mode, if the second parameter y of the feedback mode is 0, the user equipment does not feed back PMI and RI; and if the second parameter y of the feedback mode is larger than 0, the user equipment feeds back PMI and RI.

In the step of the user equipment determining the second parameter y of the feedback mode according to the number of CSI-RS ports and the indication information, if the indication information indicates that PMI and RI are not fed back, then the second parameter y of the feedback mode is 0;

if the indication information indicates that PMI and RI are fed back and the number of CSI-RS ports is 1, then the second parameter y of the feedback mode is 0;

if the indication information indicates that PMI and RI are fed back and the number of CSI-RS ports is larger than 1, then the second parameter y of the feedback mode is larger than 0;

the transmission mode configured by the high layer signaling is a transmission mode 9; and in the step of the user equipment feeding back the channel state information according to the determined feedback mode, if the second parameter y of the feedback mode is 0, the user equipment does not feed back PMI and RI; and if the second parameter y of the feedback mode is larger than 0, the user equipment feeds back PMI and RI.

The step of determining the feedback mode according to the transmission mode configured by the high layer signaling, the first parameter x of the feedback mode and the second parameter y of the feedback mode comprises:

when the feedback is periodic, if the determined second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; and if the determined second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively.

The step of determining the feedback mode according to the transmission mode configured by the high layer signaling, the first parameter x of the feedback mode and the second parameter y of the feedback mode comprises:

when the feedback is non-periodic, if the determined second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; and if the determined second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

The present document further provides a user equipment, comprising:

a second parameter determining module, configured to determine a second parameter y of a feedback mode according to the number of Channel-State Information-reference signals (CSI-RS) ports configured by a high layer signaling or according to the number of CSI-RS ports and indication information indicating whether to feed back pre-coding matrix indicator (PMI) and rank indicator (RI);

a feedback mode determining module, configured to determine the feedback mode according to a transmission mode configured by the high layer signaling, a first parameter x of the feedback mode and the second parameter y of the feedback mode; and a feedback module, configured to feed back channel state information according to the feedback mode determined by the feedback mode determining module.

The second parameter determining module is configured to, when determining the second parameter y of the feedback mode according to the number of CSI-RS ports, if the number of CSI-RS ports is 1, then determine that the second parameter y of the feedback mode is 0, and if the number of CSI-RS ports is larger than 1, then determine that the second parameter y of the feedback mode is larger than 0; and the feedback module is configured to feed back the channel state information according to a following way: when the transmission mode configured by the high layer signaling is a transmission mode 9, if the second parameter y of the feedback mode is 0, not feeding back PMI and RI, and if the second parameter y of the feedback mode is larger than 0, feeding back PMI and RI.

The second parameter determining module is configured to, when determining the second parameter y of the feedback mode according to the number of CSI-RS ports and the indication information, if the number of CSI-RS ports is 1, then determine that the second parameter y of the feedback mode is 0;

if the number of CSI-RS ports is larger than 1 and the indication information indicates that PMI and RI are not fed back, then determine that the second parameter y of the feedback mode is 0;

if the number of CSI-RS ports is larger than 1 and the indication information indicates that PMI and RI are fed back, then determine that the second parameter y of the feedback mode is larger than 0; and the feedback module is configured to feed back the channel state information according to a following way: when the transmission mode configured by the high layer signaling is a transmission mode 9, if the second parameter y of the feedback mode is 0, not feeding back PMI and RI, and if the second parameter y of the feedback mode is larger than 0, feeding back PMI and RI.

The second parameter determining module is configured to, when determining the second parameter y of the feedback mode according to the number of CSI-RS ports and the indication information, if the indication information indicates that PMI and RI are not fed back, then determine that the second parameter y of the feedback mode is 0;

if the indication information indicates that PMI and RI are fed back and the number of CSI-RS ports is 1, then determine that the second parameter y of the feedback mode is 0;

if the indication information indicates that PMI and RI are fed back and the number of CSI-RS ports is larger than 1, then determine that the second parameter y of the feedback mode is larger than 0; and the feedback module is configured to feed back the channel state information according to a following way: when the transmission mode configured by the high layer signaling is a transmission mode 9, if the second parameter y of the feedback mode is 0, not feeding back PMI and RI; if the second parameter y of the feedback mode is larger than 0, feeding back PMI and RI.

The feedback mode determining module is configured to determine the feedback mode according to a following way:

when the feedback is periodic, if the second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; if the second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively; and when the feedback is non-periodic, if the second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; if the second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

The present document, through the number of CSI-RS ports configured by high layer signaling or according to the number of CSI-RS ports and the indication information indicating whether to feed back the PMI and the RI, determines whether there is a requirement to feed back the PMI/RI, to make the transmission mode 9 be able to support the switching between the two feedback mode types, which improves the system flexibility and performance and reduces the feedback overhead.

PREFERRED EMBODIMENTS OF THE PRESENT INVENTION

The present document determines whether requiring to feed back a pre-coding matrix indicator (PMI)/rank indicator (RI) according to the number of CSI-RS ports configured by a high layer signaling or according to the number of CSI-RS ports and indication information indicating whether to feed back PMI and RI, which makes a transmission mode 9 able to support switching between the two feedback mode types, improves flexibility and performance of the system, and reduces the feedback overhead.

Figure 1:
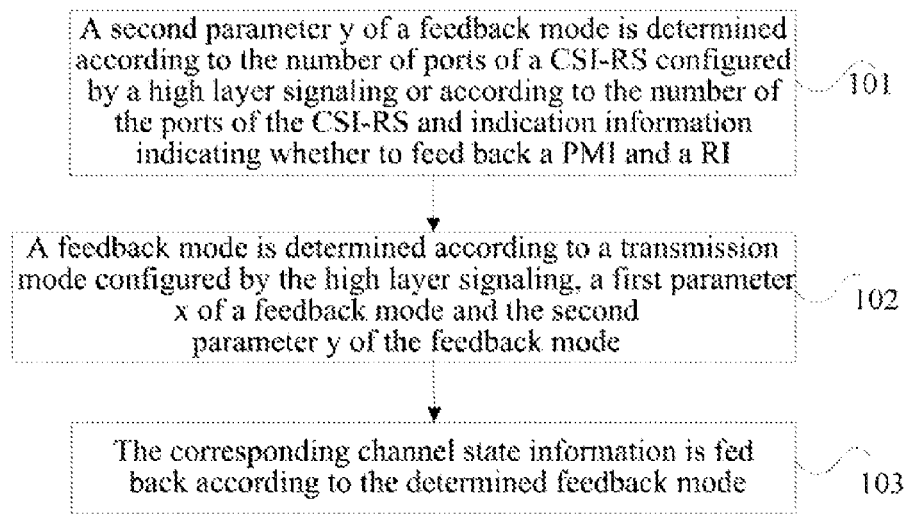
FIG. 1 is a schematic diagram of a method for feeding back channel state information of the present document.
Figure 2:
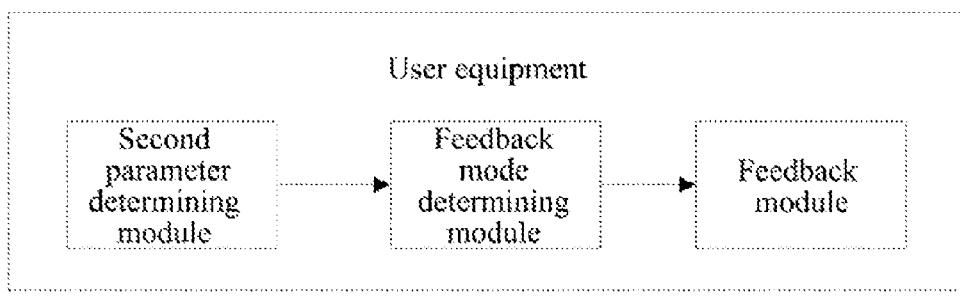
FIG. 2 is a schematic diagram of a module structure of a user equipment of the present document.

As shown in FIG. 1, a method for feeding back channel state information of the present document includes the following steps.

In step 101, a user equipment determines a second parameter y of a feedback mode according to the number of CSI-RS ports configured by a high layer signaling or according to the number of CSI-RS ports and indication information indicating whether to feed back a pre-coding matrix indicator (PMI) and rank indicator (RI).

A base station configures the parameters of the CSI-RS through the high layer signaling, wherein the parameters include the number of CSI-RS ports; and the user equipment determines the number of the current CSI-RS ports according to the configured high layer signaling.

In the existing protocol, the feedback mode is represented by mode x-y; in the present document, x is called as a first parameter of the feedback mode, and y is the second parameter of the feedback mode; wherein, x=1 represents the broadband CQI/PMI, x=2 represents that the UE selects the sub-band CQI, x=3 represents that the high level configures the sub-band CQI, y=0 represents that there is no PMI, y=1 represents a single PMI, and y=2 represents a plurality of PMIs, and this rule is suitable for reporting periodically and non-periodically.

The number of CSI-RS ports determines whether there is a PMI/RI in the selected feedback mode, that is, whether the PMI/RI is fed back; if there is the PMI/RI in the feedback mode, then y=0, and the PMI/RI is fed back; if not, then y>0, and the PMI/RI is not fed back.

When the number of CSI-RS ports is equal to 1, then the feedback mode without the PMI/RI is selected, that is, y=0; and when the number of CSI-RS ports is larger than 1, then the feedback mode with the PMI/RI is selected, that is, y>0.

In step 102, the user equipment determines the feedback mode according to a transmission mode configured by the high layer signaling, a first parameter x of the feedback mode and the second parameter y of the feedback mode.

The current transmission mode and the value of x can be determined directly according to the high layer signaling.

For a periodic feedback of a transmission mode 9, the UE can determine x=1 or x=2 directly according to the high layer signaling, and determine y=0 or y>0 according to the number of CSI-RS ports, and finally realizes selecting one mode from feedback modes of a mode 1-1, a mode 2-1, a mode 1-0 and a mode 2-40.

For a non-periodic feedback of a transmission mode 9, the UE can determine x=1 or x=2 or 3 directly according to the high layer signaling, and determine y=0 or y>0 according to the number of CSI-RS ports, and finally realizes selecting one mode from a mode 1-2, a mode 2-2, a mode 3-1, a mode 2-0 and a mode 3-0.

Specifically, when it is the periodic feedback, if the determined second parameter y of the feedback mode is 0, the transmission mode configured by the high layer signaling is the transmission mode 9, and the first parameter x of the feedback mode is 1 or 2, then the determined feedback mode is the mode 1-0 or the mode 2-0 respectively; if the determined second parameter y of the feedback mode is larger than 0, the transmission mode configured by the high layer signaling is the transmission mode 9, and the first parameter x of the feedback mode is 1 or 2 respectively, then the determined feedback mode is the mode 1-1 or mode 2-1 respectively.

When it is the non-periodic feedback, if the determined second parameter y of the feedback mode is 0, the transmission mode configured by the high layer signaling is the transmission mode 9, and the first parameter x of the feedback mode is 2 or 3, then the determined feedback mode is the mode 2-0 or the mode 3-0 respectively; if the determined second parameter y of the feedback mode is larger than 0, the transmission mode configured by the high layer signaling is the transmission mode 9, and the first parameter x of the feedback mode is 1, 2 or 3 respectively, then the determined feedback mode is the mode 1-2, the mode 2-2 or the mode 3-1 respectively.

Generally speaking, if the feedback is through the physical uplink control channel (PUCCH), then the feedback is the periodic feedback; if the feedback is through the physical uplink shared channel (PUSCH), then the feedback is the non-periodic feedback.

To the selected feedback mode, no matter whether the high layer signaling has configured the instruction signaling whether there is a PMI/RI or not, the user equipment can determine whether to feed back the PMI/RI according to the number of CSI-RS ports.

In step 103, the user equipment feeds back the corresponding channel state information according to the determined feedback mode.

When the user equipment determines the second parameter y of the feedback mode according to the number of CSI-RS ports, the examples refer to embodiments 1 and 2 hereinafter. The situation of the feedback is as follows:

when the transmission mode configured by the high layer signaling is the transmission mode 9, if the number of CSI-RS ports is 1, then the second parameter y of the feedback mode is 0, and the user equipment does not feed back the pre-coding matrix indicator (PMI) and the rank indicator (RI); if the number of CSI-RS ports is larger than 1, then the second parameter y of the feedback mode is larger than 0, and the user equipment feeds back the pre-coding matrix indicator (PMI) and the rank indicator (RI).

When the user equipment determines the second parameter y of the feedback mode according to the number of CSI-RS ports and the indicating information, preferably, it has the following two schemes:

in scheme one, the examples refers to an embodiment 3 hereinafter, when the transmission mode configured by the high layer signaling is the transmission mode 9, wherein:

if the number of CSI-RS ports is 1, then the second parameter y of the feedback mode is 0, and the user equipment does not feed back PMI and RI; under this situation, no matter what the content of the indication information is, y is determined as 0 always;

if the number of CSI-RS ports is larger than 1, and the indication information indicates not to feed back PMI and RI, then the second parameter y of the feedback mode is 0, and the user equipment does not feed back PMI and RI;

if the number of CSI-RS ports is larger than 1, and the indication information indicates to feed back PMI and RI, then the second parameter y of the feedback mode is larger than 0, and the user equipment feeds back PMI and RI.

In scheme two, referring to an embodiment 4 hereinafter specifically, when the transmission mode configured by the high layer signaling is the transmission mode 9, wherein:

if the indication information indicates not to feed back PMI and RI, then the second parameter y of the feedback mode is 0, and the user equipment does not feed back PMI and RI; under this situation, no matter whether the number of the ports of is 1, y is determined as 0 always;

if the indication information indicates to feed back PMI and RI and the number of CSI-RS ports is 1, then the second parameter y of the feedback mode is 0, and the user equipment does not feed back PMI and RI;

if the indication information indicates to feed back PMI and RI and the number of CSI-RS ports is larger than 1, then the second parameter y of the feedback mode is larger than 0, and the user equipment feeds back PMI and RI.

When the determined feedback modes are different, feedback reports are also different to some extent. The embodiments of the present document are described in detail with reference to the accompanying drawings hereinafter. It should be illustrated that, in the case of not conflicting, the embodiments in the present application and features in these embodiments can be combined with each other.

Embodiment 1

Supposing that the base station configures the transmission mode 9 for one UE, then a transmission strategy of PDSCH of this UE is a closed-loop spatial multiplexing supporting at most 8 layers. In addition, the base station configures 8 CSI-RS ports for the UE, and the CSI-RS port numbers are 15, 16, 17, 18, 19, 20, 21 and 22.

Specifically, the process of the user equipment feeding back the channel state information includes the following steps.

A1, the user equipment determines that the number of CSI-RS ports is 8 according to the high level configuration signaling, and determines whether there is the PMI/RI feedback according to the number of CSI-RS ports; specifically, the number of the current CSI-RS ports is equal to 8, which is obviously larger than 1, so the feedback mode with the PMI/RI is selected, so there is y>0.

B1, the user determines the current transmission mode according to the high layer signaling, and the current transmission mode is 9; the user equipment determines the current feedback mode according to the x in the high layer signaling, the y determined by the number of CSI-RS ports and the current transmission mode.

The feedback mode is represented by the mode x-y; wherein, x=1 represents the broadband CQI/PMI; x=2 represents that the UE selects the sub-band CQI; x=3 represents that the high level configures the sub-band CQI; y=0 represents that there is no PMI; y=1 represents a single PMI; y=2 represents a plurality of PMIs, and this rule is suitable for reporting periodically and non-periodically.

As to the periodic feedback of the transmission mode 9, that is, feeding back through the physical uplink control channel PUCCH, the UE can determine the x directly according to the high layer signaling and determine y>0 according to the number of CSI-RS ports, and selects a mode from the feedback modes of the mode 1-1 and the mode 2-1 according to the acquired x and y; and this feedback mode is the mode x-1, wherein, x is equal to 1 or 2.

As to the non-periodic feedback of the transmission mode 9, that is, feeding back through the physical uplink shared channel PUSCH, the UE can determine x=1 or x=2 or 3 directly according to the high layer signaling, and determine y>0 according to the number of CSI-RS ports, and realizes selecting a mode from the mode 1-2, the mode 2-2 and the mode 3-1 finally. This feedback is in a mode x0-y0, wherein, x0 is equal to 1 or 2 or 3; if x0=1 or 2, then y0=2; and if x0=3, then y0=1.

As to the transmission mode 9, no matter whether the high layer signaling configures the instruction signaling of whether there is a PMI/RI, the user equipment determines that there is the feedback of the PMI/RI according to the number of CSI-RS ports being equal to 8.

C1, the user equipment feeds back the channel state information according to the determined feedback mode.

According to the feedback way (the periodic feedback or the non-periodic feedback), the determined feedback mode has the following situations.

When it is the periodic feedback, if the determined feedback mode is the mode 1-1, a sub-mode 1 and a sub-mode 2 are further distinguished through a channel state information report sub-mode distinguishing parameter of the PUCCH mode 1-1 (PUCCH_format1-1_CSI_reporting_mode) in the high layer signaling. As to the sub-mode 1, the UE will feed back two reports, wherein, one report carries joint encoding index information of the RI and the first PMI, and the other report carries the second PMI of the broadband and the CQI information of the broadband. As to the sub-mode 2, the UE will feed back two reports, wherein, the first report includes the RI information, and the second report includes the first PMI of the broadband, the second PMI of the broadband and the broadband CQI.

When it is the periodic feedback, if the determined feedback mode is the mode 2-1, the UE will feed back 3 reports: the first report carries the RI and 1 bit Pre-coding type indicator (PTI); when the PTI=0, the second report carries the first PMI of the broadband, and the third report carries the broadband CQI and the second PMI of the broadband; when the PTI=1, the second report carries the broadband CQI and the second PMI of the broadband, and the third report carries the CQI of the sub-band and the second PMI of the sub-band.

When it is the non-periodic feedback, if the determined feedback mode is the mode 1-2, then the first PMI of the broadband, the second PMI of the sub-band of each sub-band and the broadband CQI are fed back.

When it is the non-periodic feedback, if the determined feedback mode is the mode 2-2, then the first PMI of the broadband, the second PMI of the broadband and the broadband CQI, as well as the second PMIs of M sub-bands and the CQIs of M sub-bands are fed back.

When it is the non-periodic feedback, if the determined feedback mode is the mode 3-1, then the first PMI of the broadband and the second PMI of the broadband are fed back, a broadband CQI value (that is, the broadband CQI index, 4 bit) is calculated and fed back for each code word, and a sub-band CQI value is calculated and fed back for each sub-band, wherein, it is assumed that the PMI selected before is used for all sub-bands when calculating the CQI.

Embodiment 2

Supposing that the base station configures the transmission mode 9 for one UE, then the transmission strategy of PDSCH of this UE is a closed-loop spatial multiplexing supporting at most 8 layers. In addition, the base station only configures 1 CSI-RS port for the UE, and the CSI-RS port number is 15.

Specifically, the process of the user equipment feeding back the channel state information includes the following steps.

A2, the user equipment determines that the number of CSI-RS ports is 1 according to the high level configuration signaling, and determines whether there is a PMI/RI feedback according to the number of CSI-RS ports; specifically, the number of the current CSI-RS ports is equal to 1, so the feedback mode without the PMI/RI is selected, and y=0.

B2, the user determines the current transmission mode according to the high layer configuration signaling, and the current transmission mode is 9; and determines the current feedback mode according to the x in the high layer signaling, the y determined by the number of CSI-RS ports and the current transmission mode.

As to the transmission mode 9, no matter whether the high layer signaling configures the instruction signaling about whether there is a PMI/RI or not, the user equipment determines that there is no the feedback of the PMI/RI according to the number of CSI-RS ports being equal to 1.

As to the periodic feedback of the transmission mode 9, that is, the feedback through the physical uplink control channel PUCCH, the UE can determine the x directly according to the high layer signaling, determine y=0 according to the number of CSI-RS ports, and selects a mode from the feedback modes of the mode 1-0 and the mode 2-0 according to the acquired x and y; and this feedback mode is a mode x-0, wherein, x0 is equal to 1 or 2.

As to the non-periodic feedback of the transmission mode 9, that is, the feedback through the physical uplink shared channel PUSCH, the UE can determine x=2 or 3 directly according to the high layer signaling, and determine y=0 according to the number of CSI-RS ports, and realizes selecting a mode from the mode 2-0 and the mode 3-0 finally. This feedback is a mode x-0, wherein, x0 is equal to 2 or 3.

C2, the user equipment feeds back the channel state information according to the determined feedback mode.

According to the feedback way (the periodic feedback or the non-periodic feedback), the determined feedback mode has the following situations.

When it is the periodic feedback, if the determined feedback mode is the mode 1-0, the UE will feed back the broadband CQI information; if the determined feedback mode is the mode 2-0, the UE will feed back the broadband CQI and the selected sub-band CQI.

When it is the non-periodic feedback, if the determined feedback mode is the mode 2-0, the CQI of the broadband and the CQIs of the M sub-bands are fed back; if the determined feedback mode is the mode 3-0, a broadband CQI value (that is, the broadband CQI index, 4 bit) is calculated and fed back for each code word, and a sub-band CQI value is calculated and fed back for each sub-band.

In the above-mentioned embodiment 1 and embodiment 2, the user equipment determines the second parameter y of the feedback mode according to the number of CSI-RS ports. In the following embodiment 3 and embodiment 4, the user equipment determines the second parameter y of the feedback mode according to the number of CSI-RS ports and the indication information.

Embodiment 3

Supposing that the base station configures the transmission mode 9 for one UE, then the transmission strategy of PDSCH of this UE is a closed-loop spatial multiplexing supporting at most 8 layers. In addition, the base station configures 8 CSI-RS ports for the UE, and the CSI-RS port numbers are 15, 16, 17, 18, 19, 20, 21 and 22.

Specifically, the process of the user equipment feeding back the channel state information includes the following steps.

A3, the user equipment determines that the number of CSI-RS ports is 8 according to the high layer configuration signaling, and determines whether to feed back the PMI/RI according to the number of CSI-RS ports and the indication information; specifically, when the indication information indicates to feed back the PMI/RI, and because the number of CSI-RS ports is larger than 1, then no matter the scheme one or the scheme two mentioned hereinbefore is adopted, the feedback mode with the PMI/RI is selected, and it determines y>0.

B3, the user determines the current transmission mode according to the high layer signaling, and the current transmission mode is 9; the user equipment determines the current feedback mode according to the x in the high layer signaling, the number of CSI-RS ports, the y determined by the high layer signaling and the current transmission mode.

The feedback mode is represented by adopting a mode x-y; wherein, x=1 represents the broadband CQI/PMI; x=2 represents that the UE selects the sub-band CQI; x=3 represents that the high layer configures the sub-band CQI; y=0 represents that there is no PMI; y=1 represents a single PMI; y=2 represents a plurality of PMIs, and this rule is suitable for reporting periodically and non-periodically.

As to the periodic feedback of the transmission mode 9, that is, generally feeding back through the physical uplink control channel PUCCH, the UE can determine the x directly according to the high layer signaling and determine y>0 according to the number of CSI-RS ports and the high layer signaling, and selects a mode from the feedback modes of the mode 1-1 and the mode 2-1 according to the acquired x and y; and this feedback mode is the mode x-1, wherein, x is equal to 1 or 2.

As to the non-periodic feedback of the transmission mode 9, that is, generally feeding back through the physical uplink shared channel PUSCH, the UE can determine x=1 or x=2 or 3 directly according to the high layer signaling, and determine y>0 according to the number of CSI-RS ports and the high layer signaling, and realizes selecting a mode from the mode 1-2, the mode 2-2 and the mode 3-1 finally. This feedback is a mode x0-y0, wherein, x0 is equal to 1 or 2 or 3; if x0=1 or 2, then y0=2; if x0=3, then y0=1.

C3, the user equipment feeds back the channel state information according to the determined feedback mode.

According to the feedback way (the periodic feedback or the non-periodic feedback), the determined feedback mode has the following situations.

When it is the periodic feedback, if the determined feedback mode is the mode 1-1, a sub-mode 1 and a sub-mode 2 are further distinguished through a channel state information report sub-mode distinguishing parameter of the PUCCH mode 1-1 (the PUCCH_format1-1_CSI_reporting_mode) in the high layer signaling. As to the sub-mode 1, the UE will feed back two reports, wherein, one report carries the joint coding index information of the RI and the first PMI, and the other report carries the second PMI of the broadband and the CQI information of the broadband. As to the sub-mode 2, the UE will feed back two reports, wherein, the first report includes the RI information, and the second report includes the first PMI of the broadband, the second PMI of the broadband and the broadband CQI.

When it is the periodic feedback, if the determined feedback mode is the mode 2-1, the UE will feed back 3 reports: the first report carries the RI and 1 bit PTI; when the PTI=0, the second report carries the first PMI of the broadband, and the third report carries the broadband CQI and the second PMI of the broadband; when the PTI=1, the second report carries the broadband CQI and the second PMI of the broadband, and the third report carries the sub-band CQI and the second PMI of the sub-band.

When it is the non-periodic feedback, if the determined feedback mode is the mode 1-2, the first PMI of the broadband, the sub-band second PMI of each sub-band and the broadband CQI are fed back.

When it is the non-periodic feedback, if the determined feedback mode is the mode 2-2, the first PMI of the broadband, the second PMI of the broadband and the broadband CQI, as well as the second PMI of M sub-bands and the CQI of M sub-bands are fed back.

When it is the non-periodic feedback, if the determined feedback mode is the mode 3-1, the first PMI of the broadband and the second PMI of the broadband are fed back, a broadband CQI value (that is, broadband CQI index, 4 bit) is calculated and fed back for each code word, and a sub-band CQI value is calculated and fed back for each sub-band, wherein, it is assumed that the PMI selected before is used for all sub-bands when calculating the CQI.

Embodiment 4

Supposing that the base station configures the transmission mode 9 for one UE, then the transmission strategy of PDSCH of this UE is a closed-loop spatial multiplexing supporting at most 8 layers. In addition, the base station configures 8 CSI-RS ports for the UE, and the CSI-RS port numbers are 15, 16, 17, 18, 19, 20, 21 and 22.

Specifically, the process of the user equipment feeding back the channel state information includes the following steps.

A4, the user equipment determines that the number of CSI-RS ports is 8 according to the high layer configuration signaling, and determines whether to feed back the PMI/RI according to the number of CSI-RS ports and the indication information; specifically, the indication information indicates not to feed back the PMI/RI, and the number of the ports of the current CSI-RS is larger than 1; and if the scheme one is adopted, then the feedback mode without the PMI/RI is selected, and y=0.

B4, the user determines the current transmission mode according to the high layer configuration signaling, and the current transmission mode is 9; and determines the current feedback mode according to the x in the high layer signaling, the number of CSI-RS ports, the y determined by the high layer signaling and the current transmission mode;

as to the periodic feedback of the transmission mode 9, that is, feeding back through the physical uplink control channel PUCCH, the UE can determine the x directly according to the high layer signaling and determine y=0 according to the number of CSI-RS ports, and selects one mode from the feedback modes of the mode 1-0 and the mode 2-0 according to the acquired x and y; and this feedback mode is a mode x-0, wherein, x0 is equal to 1 or 2.

As to the non-periodic feedback of the transmission mode 9, that is, through the physical uplink shared channel PUSCH, the UE can determine x=2 or 3 directly according to the high layer signaling and determine y=0 according to the number of CSI-RS ports, and realizes selecting one mode from the mode 2-0 and the mode 3-0 finally. This feedback is a mode x-0, wherein, x0 is equal to 2 or 3.

C4, the user equipment feeds back the channel state information according to the determined feedback mode.

According to the feedback way (the periodic feedback or the non-periodic feedback), the determined feedback mode has the following situations.

When it is the periodic feedback, if the determined feedback mode is the mode 1-0, the UE will feed back the broadband CQI information; if the determined feedback mode is the mode 2-0, the UE will feed back the broadband CQI and the selected sub-band CQI.

When it is the non-periodic feedback, if the determined feedback mode is the mode 2-0, the CQI of the broadband and the CQIs of the M sub-bands are fed back; if the determined feedback mode is the mode 3-0, one broadband CQI value (that is, broadband CQI index, 4 bit) is calculated and fed back for each code word, and one sub-bans CQI value is calculated and fed back for each sub-band.

Corresponding to the above-mentioned method, the present document further provides a user equipment. The user equipment includes:

a second parameter determining module, configured to determine a second parameter y of a feedback mode according to the number of channel state indication-reference signal (CSI-RS) ports configured by a high layer signaling or according to the number of CSI-RS ports and indication information indicating whether to feed back a pre-coding matrix indicator (PMI) and rank indicator (RI);

a feedback mode determining module, configured to determine the feedback mode according to a transmission mode configured by the high layer signaling, a first parameter x of the feedback mode and the second parameter y of the feedback mode; and a feedback module, configured to feed back corresponding channel state information according to the feedback mode.

Furthermore, when the second parameter determining module determines the second parameter y of the feedback mode according to the number of CSI-RS ports and the transmission mode configured by the high layer signaling is a transmission mode 9, if the number of CSI-RS ports is 1, then the second parameter y of the feedback mode determined by the second parameter determining module is 0, and the feedback module dose not feed back the pre-coding matrix indicator (PMI) and the rank indicator (RI); if the number of CSI-RS ports is larger than 1, then the second parameter y of the feedback mode determined by the second parameter determining module is larger than 0, and the feedback module feeds back the pre-coding matrix indicator (PMI) and the rank indicator (RI).

Furthermore, when the second parameter determining module determines the second parameter y of the feedback mode according to the number of CSI-RS ports and the indication information, and the transmission mode configured by the high layer signaling is the transmission mode 9, if the number of CSI-RS ports is 1, then the second parameter y of the feedback mode determined by the second parameter determining module is 0, and the feedback module does not feed back the PMI and the RI;

if the number of CSI-RS ports is larger than 1 and the indication information indicates that PMI and RI are not fed back, then the second parameter y of the feedback mode determined by the second parameter determining module is 0, and the feedback module does not feed back the PMI and the RI;

if the number of CSI-RS ports is larger than 1 and the indication information indicates that PMI and RI are fed back, then the second parameter y of the feedback mode determined by the second parameter determining module is larger than 0, and the feedback module feeds back the PMI and the RI.

Furthermore, when the second parameter determining module determines the second parameter y of the feedback mode according to the number of CSI-RS ports and the indication information, and the transmission mode configured by the high layer signaling is the transmission mode 9, if the indication information indicates that PMI and RI are not fed back, then the second parameter y of the feedback mode determined by the second parameter determining module is 0, and the feedback module does not feed back the PMI and the RI;

if the indication information indicates that PMI and RI are fed back and the number of CSI-RS ports is 1, then the second parameter y of the feedback mode determined by the second parameter determining module is 0, and the feedback module does not feed back the PMI and the RI;

if the indication information indicates that PMI and RI are fed back and the number of CSI-RS ports is larger than 1, then the second parameter y of the feedback mode determined by the second parameter determining module is larger than 0, and the feedback module feeds back the PMI and the RI.

Furthermore, when the feedback is periodic, if the determined second parameter y of the feedback mode is 0, the transmission mode configured by the high layer signaling is the transmission mode 9, and the first parameter x of the feedback mode is 1 or 2, then the determined feedback mode is a mode 1-0 or a mode 2-0 respectively; if the determined second parameter y of the feedback mode is larger than 0, the transmission mode configured by the high layer signaling is the transmission mode 9, and the first parameter x of the feedback mode is 1 or 2 respectively, then the determined feedback mode is a mode 1-1 or a mode 2-1 respectively.

Furthermore, when the feedback is non-periodic, if the determined second parameter y of the feedback mode is 0, the transmission mode configured by the high layer signaling is the transmission mode 9, and the first parameter x of the feedback mode is 2 or 3, then the determined feedback mode is a mode 2-0 or a mode 3-0 respectively; if the second parameter y of the determined feedback mode is larger than 0, the transmission mode configured by the high layer signaling is the transmission mode 9, and the first parameter x of the feedback mode is 1, 2 or 3 respectively, then the determined feedback mode is a mode 1-2, a mode 2-2 or a mode 3-1 respectively.

It is understandable that the present document only describes function modules of the user equipment which are distinguished from those in the related art, while, for the other function modules there is no particular limitation in the present document.

The indication information described hereinbefore can be the information directly indicating whether to feed back PMI and RI, and also can be the information indicating the feedback mode type (divided into the feedback mode type of feeding back the PMI/RI and the feedback mode type of not feeding back the PMI/RI), and there is no limitation for this in the present document.

The above description is only the preferred embodiments of the present document and is not intended to limit the present document. For those skilled in the art, the present document can have various changes and variations. All of modifications, equivalents and/or improvements without departing from the spirit and essence of the present document should be embodied in the scope of the appending claims of the present document. It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The present document, through the number of CSI-RS ports configured by the high layer signaling or according to the number of CSI-RS ports and the indication information indicating whether to feed back the pre-coding matrix indicator (PMI) and the rank indicator (RI), uniquely determines whether there is a PMI/RI feedback in the current feedback mode, that is, whether there is a requirement to feed back the PMI/RI, which makes the transmission mode 9 be able to support two forms of feedback with the PMI/RI feedback and without the PMI/RI feedback and to support the switching between the two kinds of feedback mode types. In addition, when it is the single-layer transmission and the TDD, the mode x-0 is required to be used, therefore the present document provides a method for determining the y of the mode x-y to solve the problem of the feedback mode determination, which guarantees that the correct channel state information can be selected to be fed back when it is the single-layer transmission and the TDD. The present document improves the system flexibility and performance, and reduces the feedback overhead. On the other hand, the present document does not increase any system complexity and signaling overhead, uses the parameters of the CSI-RS in the R10 effectively, and keeps a good compatibility.

INDUSTRIAL APPLICABILITY

Compared with the related art, the present document, through the number of CSI-RS ports configured by high layer signaling or according to the number of CSI-RS ports and the indication information indicating whether to feed back the PMI and the RI, determines whether there is a requirement to feed back the PMI/RI, which makes the transmission mode 9 be able to support the switching between the two kinds of feedback mode types, improves the system flexibility and performance, and reduces the feedback overhead.

What is claimed is:

1. A method for feeding back channel state information, comprising:
   a user equipment determining a second parameter y of a feedback mode according to the number of Channel-State Information-reference signals (CSI-RS) ports configured by a high layer signaling or determining the second parameter y of the feedback mode according to the number of CSI-RS ports and indication information indicating whether to feed back pre-coding matrix indicator (PMI) and rank indicator (RI);
   the user equipment determining the feedback mode according to a transmission mode configured by the high layer signaling, a first parameter x of the feedback mode and the second parameter y of the feedback mode; and
   the user equipment feeding back the channel state information according to the determined feedback mode.

2. The method according to claim 1, wherein,
   in the step of a user equipment determining a second parameter y of a feedback mode according to the number of CSI-RS ports, if the number of CSI-RS ports is 1, then the second parameter y of the feedback mode is 0; and if the number of CSI-RS ports is larger than 1, then the second parameter y of the feedback mode is larger than 0;
   the transmission mode configured by the high layer signaling is transmission mode 9; and
   in the step of the user equipment feeding back the channel state information according to the determined feedback mode, if the second parameter y of the feedback mode is 0, the user equipment does not feed back PMI and RI; and if the second parameter y of the feedback mode is larger than 0, the user equipment feeds back PMI and RI.

3. The method according to claim 1, wherein, in the step of a user equipment determining a second parameter y of a feedback mode according to the number of CSI-RS ports and indication information,
   if the number of CSI-RS ports is 1, then the second parameter y of the feedback mode is 0;
   if the number of CSI-RS ports is larger than 1 and the indication information indicates that PMI and RI are not fed back, then the second parameter y of the feedback mode is 0;
   if the number of CSI-RS ports is larger than 1 and the indication information indicates that PMI and RI are fed back, then the second parameter y of the feedback mode is larger than 0;
   the transmission mode configured by the high layer signaling is a transmission mode 9; and
   in the step of the user equipment feeding back the channel state information according to the determined feedback mode, if the second parameter y of the feedback mode is 0, the user equipment does not feed back PMI and RI; and if the second parameter y of the feedback mode is larger than 0, the user equipment feeds back PMI and RI.

4. The method according to claim 1, wherein, in the step of a user equipment determining a second parameter y of a feedback mode according to the number of CSI-RS ports and indication information,
   if the indication information indicates that PMI and RI are not fed back, then the second parameter y of the feedback mode is 0;
   if the indication information indicates that PMI and RI are fed back and the number of CSI-RS ports is 1, then the second parameter y of the feedback mode is 0;
   if the indication information indicates that PMI and RI are fed back and the number of CSI-RS ports is larger than 1, then the second parameter y of the feedback mode is larger than 0;
   the transmission mode configured by the high layer signaling is a transmission mode 9; and
   in the step of the user equipment feeding back the channel state information according to the determined feedback mode, if the second parameter y of the feedback mode is 0, the user equipment does not feed back PMI and RI; and if the second parameter y of the feedback mode is larger than 0, the user equipment feeds back PMI and RI.

5. The method according to claim 1, wherein, the step of determining the feedback mode according to a transmission mode configured by the high layer signaling, a first parameter x of the feedback mode and the second parameter y of the feedback mode comprises:
   when the feedback is periodic, if the determined second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; and if the determined second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively.

6. The method according to claim 1, wherein, the step of determining the feedback mode according to a transmission mode configured by the high layer signaling, a first parameter x of the feedback mode and the second parameter y of the feedback mode comprises:
   when the feedback is non-periodic, if the determined second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; and if the determined second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

7. A user equipment, comprising:
a second parameter determining module, configured to determine a second parameter y of a feedback mode according to the number of Channel-State Information-reference signals (CSI-RS) ports configured by a high layer signaling or determine the second parameter y of the feedback mode according to the number of CSI-RS ports and indication information indicating whether to feed back pre-coding matrix indicator (PMI) and rank indicator (RI);
a feedback mode determining module, configured to determine the feedback mode according to a transmission mode configured by the high layer signaling, a first parameter x of the feedback mode and the second parameter y of the feedback mode; and
a feedback module, configured to feed back channel state information according to the feedback mode determined by the feedback mode determining module.

8. The user equipment according to claim 7, wherein, the second parameter determining module is configured to, when determining the second parameter y of the feedback mode according to the number of CSI-RS ports, if the number of CSI-RS ports is 1, then determine that the second parameter y of the feedback mode is 0, and if the number of CSI-RS ports is larger than 1, then determine that the second parameter y of the feedback mode is larger than 0; and
the feedback module is configured to feed back the channel state information according to a following way: when the transmission mode configured by the high layer signaling is a transmission mode 9, if the second parameter y of the feedback mode is 0, not feeding back PMI and RI, and if the second parameter y of the feedback mode is larger than 0, feeding back PMI and RI.

9. The user equipment according to claim 7, wherein, the second parameter determining module is configured to, when determining the second parameter y of the feedback mode according to the number of CSI-RS ports and the indication information,
if the number of CSI-RS ports is 1, then determine that the second parameter y of the feedback mode is 0;
if the number of CSI-RS ports is larger than 1 and the indication information indicates that PMI and RI are not fed back, then determine that the second parameter y of the feedback mode is 0;
if the number of CSI-RS ports is larger than 1 and the indication information indicates that PMI and RI are fed back, then determine that the second parameter y of the feedback mode is larger than 0; and
the feedback module is configured to feed back the channel state information according to a following way: when the transmission mode configured by the high layer signaling is a transmission mode 9, if the second parameter y of the feedback mode is 0, not feeding back PMI and RI, and if the second parameter y of the feedback mode is larger than 0, feeding back PMI and RI.

10. The user equipment according to claim 7, wherein, the second parameter determining module is configured to, when determining the second parameter y of the feedback mode according to the number of CSI-RS ports and the indication information,
if the indication information indicates that PMI and RI are not fed back, then determine that the second parameter y of the feedback mode is 0;
if the indication information indicates that PMI and RI are fed back and the number of CSI-RS ports is 1, then determine that the second parameter y of the feedback mode is 0;
if the indication information indicates that PMI and RI are fed back and the number of CSI-RS ports is larger than 1, then determine that the second parameter y of the feedback mode is larger than 0; and
the feedback module is configured to feed back the channel state information according to a following way: when the transmission mode configured by the high layer signaling is a transmission mode 9, if the second parameter y of the feedback mode is 0, not feeding back PMI and RI; if the second parameter y of the feedback mode is larger than 0, feeding back PMI and RI.

11. The user equipment according to claim 7, wherein,
the feedback mode determining module is configured to determine the feedback mode according to a following way:
when the feedback is periodic, if the second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; if the second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively; and
when the feedback is non-periodic, if the second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; if the second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

12. The method according to claim 2, wherein, the step of determining the feedback mode according to a transmission mode configured by the high layer signaling, a first parameter x of the feedback mode and the second parameter y of the feedback mode comprises:
when the feedback is periodic, if the determined second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; and if the determined second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively.

13. The method according to claim 3, wherein, the step of determining the feedback mode according to a transmission mode configured by the high layer signaling, a first parameter x of the feedback mode and the second parameter y of the feedback mode comprises:
when the feedback is periodic, if the determined second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; and if the determined second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively.

14. The method according to claim 4, wherein, the step of determining the feedback mode according to a transmission mode configured by the high layer signaling, a first parameter x of the feedback mode and the second parameter y of the feedback mode comprises:

when the feedback is periodic, if the determined second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; and if the determined second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively.

15. The method according to claim 2, wherein, the step of determining the feedback mode according to a transmission mode configured by the high layer signaling, a first parameter x of the feedback mode and the second parameter y of the feedback mode comprises:

when the feedback is non-periodic, if the determined second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; and if the determined second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

16. The method according to claim 3, wherein, the step of determining the feedback mode according to a transmission mode configured by the high layer signaling, a first parameter x of the feedback mode and the second parameter y of the feedback mode comprises:

when the feedback is non-periodic, if the determined second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; and if the determined second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

17. The method according to claim 4, wherein, the step of determining the feedback mode according to a transmission mode configured by the high layer signaling, a first parameter x of the feedback mode and the second parameter y of the feedback mode comprises:

when the feedback is non-periodic, if the determined second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; and if the determined second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

18. The user equipment according to claim 8, wherein, the feedback mode determining module is configured to determine the feedback mode according to a following way:

when the feedback is periodic, if the second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; if the second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively; and when the feedback is non-periodic, if the second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; if the second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

19. The user equipment according to claim 9, wherein, the feedback mode determining module is configured to determine the feedback mode according to a following way:

when the feedback is periodic, if the second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; if the second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively; and when the feedback is non-periodic, if the second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; if the second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

20. The user equipment according to claim 10, wherein,
the feedback mode determining module is configured to
determine the feedback mode according to a following way:
when the feedback is periodic, if the second parameter y of the feedback mode is 0, the transmission mode configured by the high layer signaling is a transmission mode 9, and the first parameter x of the feedback mode is 1 or 2, then determining the feedback mode as a mode 1-0 or a mode 2-0 respectively; if the second parameter y of the feedback mode is larger than 0, the transmission mode configured by the high layer signaling is a transmission mode 9, and the first parameter x of the feedback mode is 1 or 2 respectively, then determining the feedback mode as a mode 1-1 or a mode 2-1 respectively; and
when the feedback is non-periodic, if the second parameter y of the feedback mode is 0, the transmission mode configured by the high layer signaling is a transmission mode 9, and the first parameter x of the feedback mode is 2 or 3, then determining the feedback mode as a mode 2-0 or a mode 3-0 respectively; if the second parameter y of the feedback mode is larger than 0, the transmission mode configured by the high layer signaling is a transmission mode 9, and the first parameter x of the feedback mode is 1, 2 or 3 respectively, then determining the feedback mode as a mode 1-2, a mode 2-2 or a mode 3-1 respectively.

* * * * *